United States Patent
Yang et al.

(10) Patent No.: US 9,354,473 B2
(45) Date of Patent: May 31, 2016

(54) LIQUID CRYSTAL DISPLAY APPARATUS

(71) Applicant: InnoLux Corporation, Miao-Li County (TW)

(72) Inventors: Po-Ju Yang, Miao-Li County (TW); Yu-Chien Kao, Miao-Li County (TW); Li-Wei Sung, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 72 days.

(21) Appl. No.: 13/965,606

(22) Filed: Aug. 13, 2013

(65) Prior Publication Data

US 2014/0071391 A1    Mar. 13, 2014

(30) Foreign Application Priority Data

Sep. 10, 2012  (TW) .............................. 101132959 A

(51) Int. Cl.
  *G02F 1/1339*  (2006.01)
  *G02F 1/1333*  (2006.01)
  *G02F 1/1362*  (2006.01)

(52) U.S. Cl.
  CPC ...... *G02F 1/13394* (2013.01); *G02F 1/133345* (2013.01); *G02F 1/133371* (2013.01); *G02F 1/136227* (2013.01); *G02F 2001/13396* (2013.01); *G02F 2201/50* (2013.01)

(58) Field of Classification Search
  None
  See application file for complete search history.

(56) References Cited

U.S. PATENT DOCUMENTS

| | | | |
|---|---|---|---|
| 7,773,190 B2 * | 8/2010 | Kwak | G02F 1/13392 349/157 |
| 2004/0201799 A1 * | 10/2004 | Nakayoshi et al. | 349/106 |
| 2005/0052607 A1 | 3/2005 | Mori et al. | |
| 2008/0136760 A1 | 6/2008 | Kang et al. | |
| 2010/0091231 A1 * | 4/2010 | Nishimura et al. | 349/139 |
| 2010/0194709 A1 * | 8/2010 | Tamaki | G02F 1/13338 345/174 |
| 2011/0115984 A1 * | 5/2011 | Tsubata | 348/731 |
| 2012/0314177 A1 * | 12/2012 | Hyodo et al. | 349/155 |
| 2012/0314178 A1 * | 12/2012 | Doi et al. | 349/155 |
| 2013/0021552 A1 * | 1/2013 | Tomioka et al. | 349/43 |
| 2013/0162927 A1 * | 6/2013 | Nagami | 349/43 |
| 2013/0308084 A1 * | 11/2013 | Niwano | 349/155 |

FOREIGN PATENT DOCUMENTS

| | | |
|---|---|---|
| CN | 1595245 A | 3/2005 |
| CN | 101140391 A | 3/2008 |
| EP | 1 898 253 A2 | 3/2008 |
| JP | 2005-241856 | 9/2005 |
| TW | I256500 B | 6/2006 |

* cited by examiner

*Primary Examiner* — Dung Nguyen
*Assistant Examiner* — Shan Liu
(74) *Attorney, Agent, or Firm* — Muncy, Geissler, Olds & Lowe, P.C.

(57) ABSTRACT

A liquid crystal display apparatus comprises a first substrate, a second substrate and a first spacer. The first substrate includes a transparent substrate, a metal layer, an insulating layer and a first electrode layer. The metal layer is disposed on the transparent substrate. The insulating layer is between the metal layer and first electrode layer, and covers the metal layer. The insulating layer has a first indentation. A surface of the first substrate has a second indentation corresponding to the first indentation and having a first width. The second substrate is opposite to the first substrate. The first spacer is on the second substrate and has a top surface opposite to the second indentation. The top surface and the second indentation at least partially overlap, and the top surface has a second width larger than the first width.

8 Claims, 10 Drawing Sheets

LIQUID CRYSTAL DISPLAY APPARATUS

CROSS REFERENCE TO RELATED APPLICATIONS

This Non-provisional application claims priority under 35 U.S.C. §119(a) on Patent Application No(s). 101132959 filed in Taiwan, Republic of China on Sep. 10, 2012, the entire contents of which are hereby incorporated by reference.

BACKGROUND

1. Technical Field

The disclosed embodiments relate to a liquid crystal display (LCD) apparatus and, in particular, to an active matrix LCD apparatus.

2. Related Art

With the more progress of liquid crystal display (LCD) technology, LCD apparatuses have been widely applied to various information products, such as notebooks, personal digital assistants (PDAs), smart phones, or tablet computers.

A conventional LCD apparatus mainly includes an LCD panel, which includes a thin film transistor (TFT) substrate, a color filter (CF) substrate and a liquid crystal layer disposed between the TFT and CF substrates. Besides, the LCD apparatus further includes a backlight module, which is disposed on a side of the TFT substrate facing away from the CF substrate. The TFT substrate includes a transparent substrate and a TFT layer disposed on a side of the transparent substrate. Besides, the CF substrate is disposed opposite to the TFT substrate. An interval between the TFT and CF substrates is kept by spacers.

However, when the LCD apparatus is pressed by an external force, the interval between the TFT and CF substrates will be reduced, and meanwhile, the relative movement between the spacers and the TFT substrate may occur. Accordingly, the TFT substrate may be rubbed and damaged, and thus the LCD apparatus will be subjected to a light leakage problem.

SUMMARY

In view of the foregoing problem, an objective of this disclosure is to provide an LCD apparatus that can be prevented from being rubbed and damaged by spacers when pressed by an external force so that the light leakage problem can be avoided.

To achieve the above objective, a liquid crystal display apparatus according to the embodiments of this disclosure comprises a first substrate, a second substrate and a first spacer. The first substrate includes a transparent substrate, a metal layer, an insulating layer and a first electrode layer. The metal layer is disposed on the transparent substrate. The insulating layer is disposed between the metal layer and the first electrode layer, and covers the metal layer. The insulating layer has a first indentation. A surface of the first substrate has a second indentation corresponding to the first indentation and having a first width. The second substrate is disposed opposite to the first substrate. The first spacer is disposed on the second substrate and has a top surface opposite to the second indentation. The top surface and the second indentation at least partially overlap, and the top surface has a second width which is larger than the first width.

In one embodiment, the liquid crystal display apparatus further comprises a liquid crystal layer disposed between the first substrate and the second substrate.

In one embodiment, the first spacer is not disposed against the surface of the first substrate.

In one embodiment, the metal layer is the same layer as the drain or source of a thin film transistor of the first substrate.

In one embodiment, the insulating layer includes a first insulating layer and a second insulating layer, the first insulating layer is disposed on the second insulating layer, and the second insulating layer is disposed above the thin film transistor.

In one embodiment, the first substrate further includes a second electrode layer disposed between the first and second insulating layers.

In one embodiment, the first indentation is disposed corresponding to the second indentation, and the depth of the second indentation is less than or equal to that of the first indentation.

In one embodiment, the second insulating layer has a third indentation disposed corresponding to the first indentation, and the depth of the first indentation is less than or equal to that of the third indentation.

In one embodiment, a bottom of the second indentation has a plurality of protrusions.

In one embodiment, the second substrate has an additional transparent substrate and a common electrode layer disposed on the additional transparent substrate.

In one embodiment, the liquid crystal display apparatus further comprises a second spacer disposed on the second substrate.

In one embodiment, the second spacer is disposed against the surface of the first substrate.

In one embodiment, the first spacer and the second spacer have different heights according to the direction perpendicular to the transparent substrate.

In one embodiment, the height of the second spacer is between one time and two times the height of the first spacer.

In one embodiment, the first spacer and the second spacer have the same height according to the direction perpendicular to the transparent substrate.

In one embodiment, the first and second spacers are disposed against the surface of the first substrate.

In one embodiment, the surface of the first substrate has a fourth indentation disposed corresponding to the second indentation, and the depth of the fourth indentation is less than that of the second indentation.

In one embodiment, the width of a top surface of the second spacer is larger than that of the fourth indentation.

In one embodiment, the first insulating layer further has a fifth indentation disposed corresponding to the fourth indentation, and the depth of the fourth indentation is less than or equal to that of the fifth indentation.

In one embodiment, the second insulating layer further has a sixth indentation disposed corresponding to the fifth indentation, and the depth of the fifth indentation is less than or equal to that of the sixth indentation.

As mentioned above, in the LCD apparatus according to the embodiments of this disclosure, the insulating layer covers the metal layer and has a first indentation, and the surface of the first substrate has a second indentation corresponding to the first indentation. Besides, the top surface of the first spacer at least partially overlaps the opening of the second indentation, and the second width of the top surface is larger than the first width of the second indentation. Therefore, when the LCD apparatus is pressed by an external force, the first spacers are respectively pushed into the second indentations of the first substrate with some deformation. Thereby, the pressure received by the LCD apparatus from outside can be distributed, and the more contact area can be provided when the first spacers are respectively pushed into the second indentations, resulting in the larger lateral friction, which can prevent the relative movement and accompanying rubbing between the spacers and the first substrate, so that the first substrate will not be damaged and thus the LCD apparatus will not be subjected to the light leakage problem.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION

The present invention will be apparent from the following detailed description, which proceeds with reference to the accompanying drawings, wherein the same references relate to the same elements.

Figure 1A:
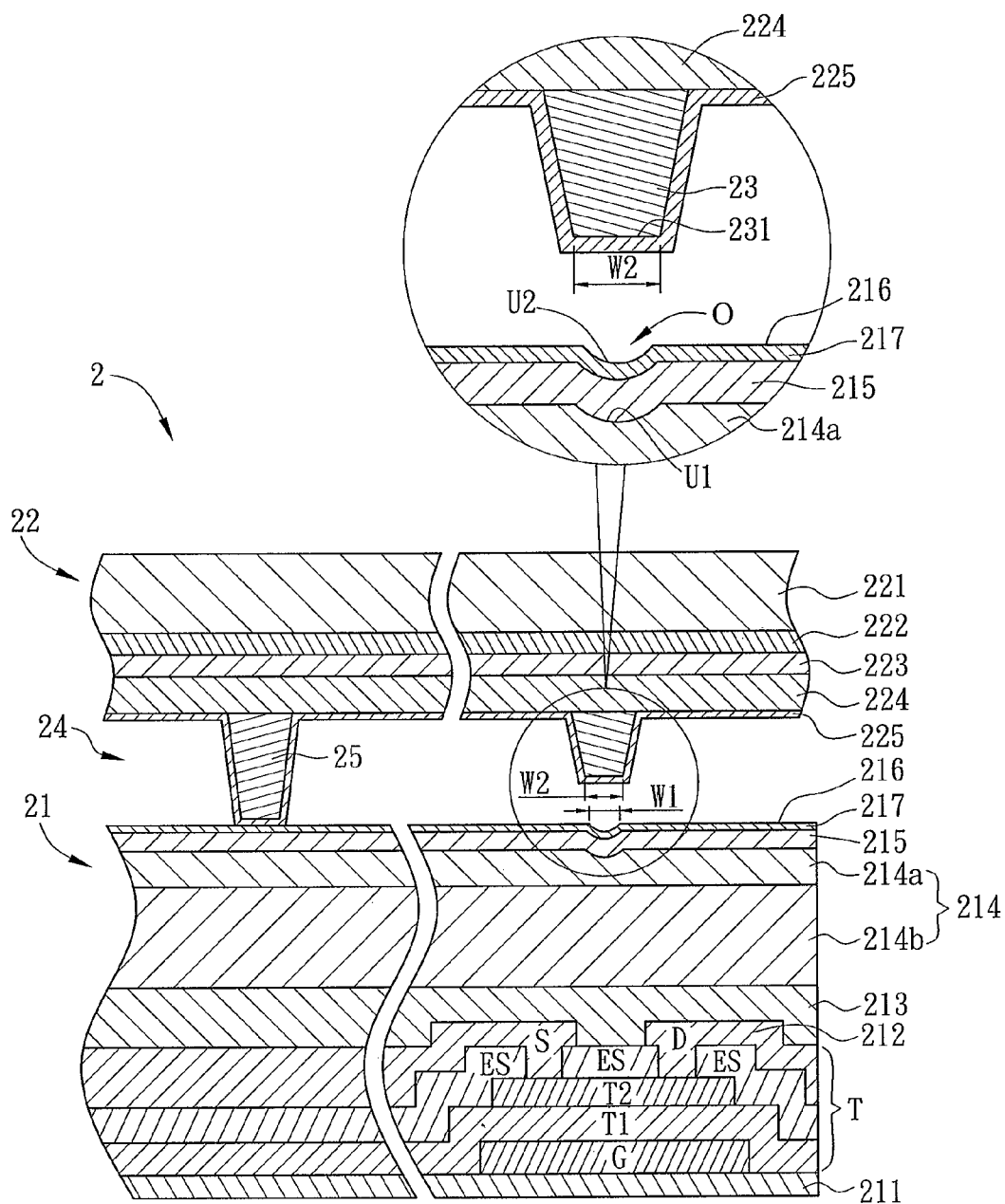
FIG. 1A is a schematic sectional diagram of a liquid crystal display (LCD) apparatus according to an embodiment of this disclosure.

FIG. 1A is a schematic sectional diagram of a liquid crystal display (LCD) apparatus 2 according to an embodiment of this disclosure.

The LCD apparatus 2 includes a first substrate 21, a second substrate 22, a liquid crystal layer 24 and a backlight module (not shown). The liquid crystal layer 24 is disposed between the first and second substrates 21 and 22 (the liquid crystal molecules are not shown in FIG. 1A). The backlight module is disposed on a side of the first substrate 21 facing away from the second substrate 22. In FIG. 1A, the backlight module can be disposed on a bottom side of the first substrate 21 to emit light towards the first substrate 21. Besides, the LCD apparatus 2 can further include a first spacer 23 and a second spacer 25.

The first substrate 21 includes a transparent substrate 211, a metal layer 212, a protection layer 213, an insulating layer 214, a first electrode layer 215 and an alignment layer 217. The first substrate 21 can further include a thin film transistor (TFT) T. The structures of the transparent substrate 211 and thin film transistor T are first illustrated as below.

The thin film transistor T is disposed on the transparent substrate 211. As an embodiment, the transparent substrate 211 can be made by a transparent material, and applied to a transmissive display apparatus. The transparent material is, for example, glass, quartz or the like, plastic material, rubber, fiberglass or other polymer material. Preferably, the transparent substrate 211 is an alumino silicate glass substrate. Otherwise, the transparent substrate 211 can be made by opaque material, and applied to a self-luminous or reflective display apparatus. In this case, the transparent substrate 211 is a metal-fiberglass composite plate or a metal-ceramic composite plate for example. The transparent substrate 211 also can be a flexible substrate, such as an acrylic substrate or a very thin glass substrate.

The thin film transistor T has a gate G, a gate dielectric layer T1, a channel layer T2, a source S and a drain D. The gate G is disposed on the transparent substrate 211, and the gate G is a single-layer or multi-layer structure composed of metal (e.g. aluminum, copper, silver, molybdenum, or titanium), alloy or their any combinations. Some of the conductive wires, such as scan lines, for transmitting driving signals can be made by the same process as the gate G and formed into the same layer as the gate G, electrically connected to the gate G. The gate dielectric layer T1 is disposed on the gate G, and can be made by organic material such as organic silicone compound, or inorganic material such as silicon nitride, silicon oxide, silicon oxynitride, silicon carbide, aluminum oxide, hafnium oxide or their any combinations. The gate dielectric layer T1 can be a single-layer or multi-layer structure. The gate dielectric layer T1 needs to completely cover the gate G, and can cover the partial or whole transparent substrate 211. The channel layer T2 is disposed on the gate dielectric layer T1 and corresponding to the gate G. As an embodiment, the channel layer T2 can contain an oxide semiconductor for example. The oxide semiconductor contains an oxide, which includes one of indium, zinc and tin for example.

The source S and the drain D are disposed on the channel layer T2, and contact the channel layer T2. When the channel layer T2 of the thin film transistor T is not enabled, the source S and the drain D are separated electrically. The source S and the drain D each can be made into a single-layer or multi-layer structure composed of metal (e.g. aluminum, copper, silver, molybdenum, or titanium), alloy or their any combinations. Besides, some of the conductive wires, such as data lines, for transmitting driving signals can be made by the same process as the source S and the drain D and into the same layer (i.e. the second metal layer M2) as the source S and the drain D. To be noted, the metal layer 212 can be the same layer as the drain D and the source S of the thin film transistor T, and can be the data line or the scan line of the LCD apparatus 2.

To be mentioned, the source S and the drain D are disposed on an etch stop layer ES, and respectively contact the channel layer T2 through the openings of the etch stop layer ES. The etch stop layer ES can be made by inorganic material such as silicon nitride, silicon oxide, silicon oxynitride, silicon carbide, aluminum oxide, hafnium oxide or their any combinations. The etch stop layer ES can be a single-layer or multi-layer structure. In other embodiments, the source S and the drain D can be directly disposed on the channel layer T2 instead of through the etch stop layer ES.

The protection layer 213 is disposed on the drain D and the source S, and covers the drain D and the source S. The insulating layer 214 is disposed between the metal layer 212 and the first electrode layer 215, covers the metal layer 212, and has a first indentation U1. Herein, that the insulating layer 214 covers the metal layer 212 doesn't mean the insulating layer 214 must contact the metal layer 212, and the insulating layer 214 can be just disposed over the metal layer 212 so that the metal layer 212 can not be exposed. Besides, that the insulating layer 214 is disposed between the metal layer 212 and the first electrode layer 215 doesn't mean the insulating layer 214 must contact the metal layer 212 or the first electrode layer 215. In this embodiment, the insulating layer 214 includes a first insulating layer 214a and a second insulating layer 214b. The first insulating layer 214a is disposed on the second insulating layer 214b, and the second insulating layer 214b is disposed above the thin film transistor T and contacts the protection layer 213. In other words, the protection layer 213 is disposed between the second insulating layer 214b and the drain D and source S. In other embodiments, the insulating layer 214 can include only one of the first insulating layer 214a and the second insulating layer 214b. The first insulating layer 214a can be made by inorganic material for example. The second insulating layer 214b can be a thin film layer, and can be made by organic material such as Polyfluoroalkoxy (PFA), for example.

In this embodiment, the first insulating layer 214a has the first indentation U1, so that a surface 216 of the first substrate 21 has a second indentation U2 corresponding to the first indentation U1. In other words, by the manufacturing method of this embodiment, the first indentation U1 is formed on the insulating layer 214 (such as on the first insulating layer 214a), so that the surface 216 of the first substrate 21 has the second indentation U2. The first indentation U1 is disposed corresponding to the second indentation U2, and the depth of the second indentation U2 can be less than or equal to the depth of the first indentation U1. Herein, the said depth denotes the depth along the direction perpendicular to the transparent substrate 211. The thickness of the second insulating layer 214b can be between 2 μm and 3 μm, and the depths of the first and second indentations U1 and U2 each can be between 0.05 μm and 1 μm, and preferably between 0.05 μm and 0.5 μm. In detail, the first indentation U1 is formed on the first insulating layer 214a, then the first electrode layer 215 is formed on the first indentation U1 so as to have an indentation, and then the alignment layer 217 is formed on the indentation of the first electrode layer 215 so as to have the second indentation U2. The width of the first indentation U1 of the first insulating layer 214a can be slightly larger than that of the indentation of the first electrode layer 215, and the width of the indentation of the first electrode layer 215 can be slightly larger than that of the second indentation U2 Herein, the said width denotes the width along the direction parallel with the transparent substrate 211.

In this embodiment the second indentation U2 is disposed above the thin film transistor T, but in other embodiments it can be disposed at other locations. Besides, in this embodiment the first electrode layer 215 is disposed on an interior side of the second indentation U2, but otherwise it is not necessarily disposed there, and it may merely overlap the partial second indentation U2, depending on the location of the first spacer 23. The first electrode layer 215 can be a pixel electrode layer or a common electrode layer, and the alignment layer 217 is disposed on the first electrode layer 215. The alignment layer 217 can be made by polyimide (PI) for example, and the liquid crystal molecules of the liquid crystal layer 24 can be arranged accordingly.

The second substrate 22 is disposed opposite to the first substrate 21. In FIG. 1A, the second substrate 22 sequentially includes a transparent substrate 221, a black matrix layer 222, a color filter layer 223, a protection layer 224 and an alignment layer 225 from top to bottom. The black matrix layer 222 is disposed on the substrate 221, and the color filter layer 223 covers the transparent substrate 221 and the black matrix layer 222. The color filter layer 223 can have a red filter portion, a green filter portion and a blue filter portion (not shown). Besides, the protection layer 224 is disposed on the color filter layer 223, the first spacer 23 and the second spacer 25 are disposed on the protection layer 224, and the alignment layer 225 is disposed on the first spacer 23, the second spacer 25 and the protection layer 224.

Figure 1B:
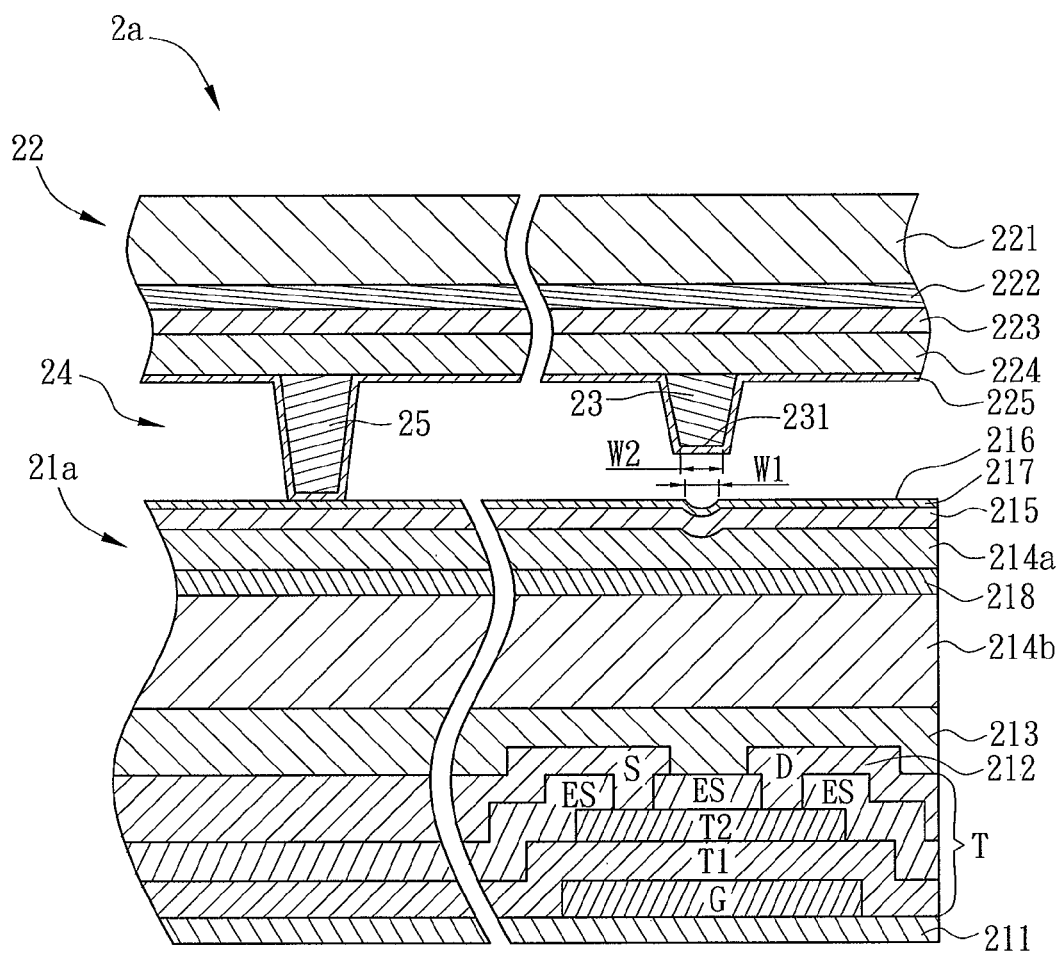
FIG. 1B is a schematic sectional diagram of a liquid crystal display apparatus according to another embodiment of this disclosure.

To be noted, the LCD apparatus 2 is an in-plane switch (IPS) type for example, so that the second substrate 22 has no transparent conductive layer. However, for other types of LCD apparatuses, such as a twisted nematic (TN) type of LCD apparatus, the second substrate 22 can have a transparent conductive layer as a common electrode layer 226 (as as shown in FIG. 1I), and this common electrode layer 226 can be disposed on the transparent substrate 221 and between the protection layer 224 and the alignment layer 225. Moreover, in this embodiment, the first substrate 21 is a TFT substrate and the second substrate 22 is a CF substrate, but in other embodiments, the black matrix layer 222 and the color filter layer 223 can be disposed to the TFT substrate, so that the first substrate 21 becomes a BOA (BM on array) substrate or a COA (color filter on array) substrate. However, this disclosure is not limited thereto.

To be noted, the LCD apparatus 2 is an in-plane switch (IPS) type for example, so that no electrode layer is disposed between the first and second insulating layers 214a and 214b. However, in another embodiment as shown in FIG. 1B, the LCD apparatus 2a is instanced as a fringe field switching (FFS) type, so that the first substrate 21a further includes a second electrode layer 218, which is disposed between the first and second insulating layers 214a and 214b. The first electrode layer 215 can be a pixel electrode layer while the second electrode layer 218 can be a common electrode layer, or the first electrode layer 215 can be a common electrode layer while the second electrode layer 218 can be a pixel electrode layer.

In FIG. 1A, the first spacer 23 is disposed on the second substrate 22 corresponding to the black matrix layer 222 of the second substrate 22, and the alignment layer 225 is disposed on the first spacer 23 and the protection layer 224. In other words, according to the direction perpendicular to the transparent substrate 211 (i.e. a top view of the LCD apparatus 2), the black matrix layer 222 can cover the first spacer 23. Otherwise, the first spacer 23 can be covered by a metal layer, so that the first spacer 23 is not necessarily disposed under the black matrix layer 222. However, the disposition of the first spacer 23 is not limited thereto.

Figure 1C:
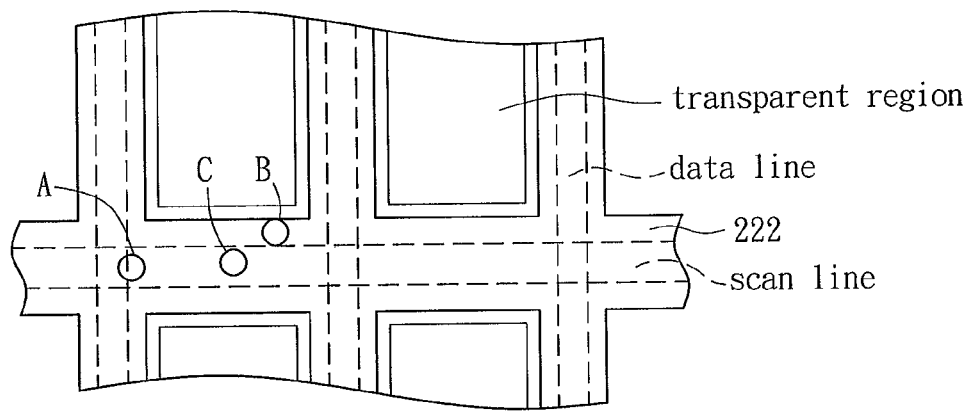
FIG. 1C is a top-view diagram of the LCD apparatus in FIG. 1A.

FIG. 1C is a top-view diagram of the LCD apparatus 2 in FIG. 1A, and only shows the scan line, data line, black matrix layer 222 and transparent region of the pixel of the LCD apparatus 2. The first spacer 23 is not necessarily disposed above the thin film transistor T (not shown in FIG. 1C). Furthermore, in FIG. 1C, the first spacer 23 can be disposed in the area A (closer to the intersection of the scan line and the data line), the area B (adjacent to the scan line), the area C (overlapping the scan line) or other locations so as to be covered or shielded by the black matrix layer 222 or the metal layer.

Figure 1D:
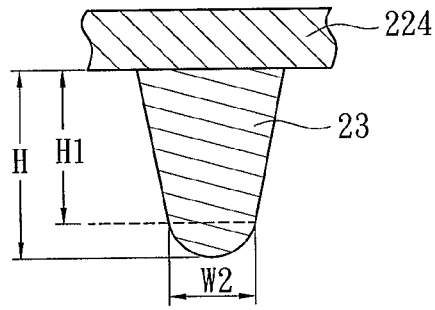
FIG. 1D is a schematic sectional diagram of a variation of the first spacer.
Figure 1E:
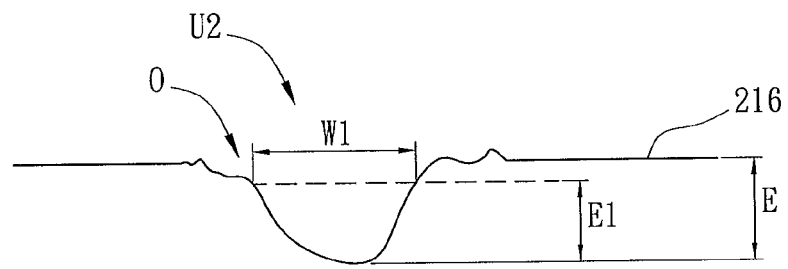
FIG. 1E is a schematic sectional diagram of a variation of the second indentation.

In FIG. 1A, the first spacer 23 of this embodiment has a top surface 231, which is disposed opposite to the second indentation U2 and doesn't contact the surface 216 of the first substrate 21. Besides, the second indentation U2 has a first width W1, and the top surface 231 has a second width W2, which can be larger than the first width W1 and not equal to the first width W1. For example, the second width W2 is 6 μm or more and less than or equal to 30 μm, and preferably between 8 μm and 20 μm. Furthermore, the first width W1 can be less than 10 μm and larger than zero, and preferably between 4 μm and 8 μm. The second indentation U2 has an opening O. According to the direction perpendicular to the transparent substrate 211, the area of the top surface 231 of the first spacer 23 can be larger than or equal to that of the opening O. The first spacer 23 can have a prismatic form for example. A cross-section of the first spacer 23 can have a polygonal form, such as a tetragon, a hexagon or an octagon, or a circular or elliptic form. Here, the cross-section of the first spacer 23 is instanced as an inverse trapezoid. The opening O of the second indentation U2 can have a circular, polygonal or irregular form. To be noted, when the top surface of the first spacer 23 is curviform or irregular as shown in FIG. 1D, the second width W2 is regarded as the sectional width at 90% of the height H (H1=0.9×H in FIG. 1D) of the first spacer 23, the height H reckoned from the connection surface of the first spacer 23 and the second substrate 22 (e.g. the protection layer 224). In another embodiment as shown in FIG. 1E, when the opening O of the second indentation U2 is too rough so that the first width W1 is difficult to be measured, the first width W1 is regarded as the sectional width at 90% of the depth E (E1=0.9×E in FIG. 1E) of the second indentation U2 reckoned from the bottommost point to the surface 216. Here, the second width W2 in FIG. 1D and the first width W1 in FIG. 1E have different proportions.

Figure 1F:
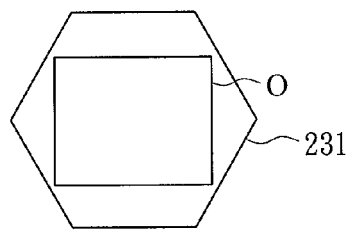
FIGS. 1F and 1G are schematic diagrams showing variations of the overlap between the top surface of the first spacer and the opening of the second indentation according to the direction perpendicular to the transparent substrate of the first substrate in FIG. 1A.
Figure 1G:
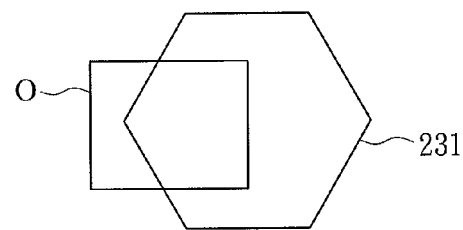

FIGS. 1F and 1G are schematic diagrams showing variations of the overlap between the top surface 231 of the first spacer 23 and the opening O of the second indentation U2 according to the direction perpendicular to the transparent substrate 211. Here, the top surface 231 has a hexagonal form and the opening O has a tetragonal form, for example.

In FIG. 1F, according to the direction perpendicular to the transparent substrate 211, the top surface 231 and the opening O of the second indentation U2 completely overlap each other. In FIG. 1G, the top surface 231 and the opening O of the second indentation U2 partially overlap each other. Hence, according to the direction perpendicular to the transparent substrate 211, the top surface 231 and the opening O of the second indentation U2 at least partially overlap each other.

In FIG. 1A, the second spacer 25 is disposed on the second substrate 22. The second spacer 25 is disposed on the protection layer 224 corresponding to the black matrix layer 222. The number of the first spacers 23 is much larger than that of the second spacers 25. Each of the first and second spacers 23 and 25 can be made by resin, silicate, fiberglass or other kinds of photosensitive photo-resist material. The second spacer 25 is disposed against the surface 216 of the first substrate 21 through the alignment layer 225. In other words, the first and second spacers 23 and 25 have different heights according to the direction perpendicular to the transparent substrate 211, so as to have a height difference. Here, the height of the second spacer 25 can be between one time and two times the height of the first spacer 23, and preferably between one time and 1.5 times the height of the first spacer 23.

Figure 1H:
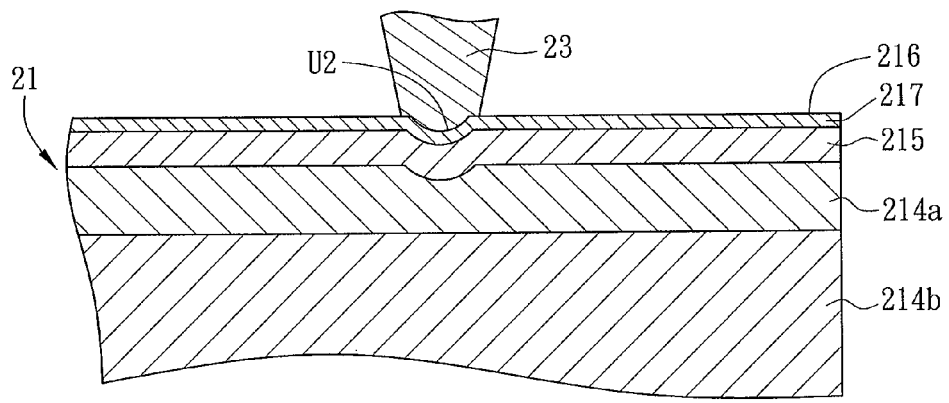
FIG. 1H is a schematic diagram of the first spacer moved against the first substrate when the LCD apparatus in FIG. 1A is pressed by an external force.
Figure 1I:
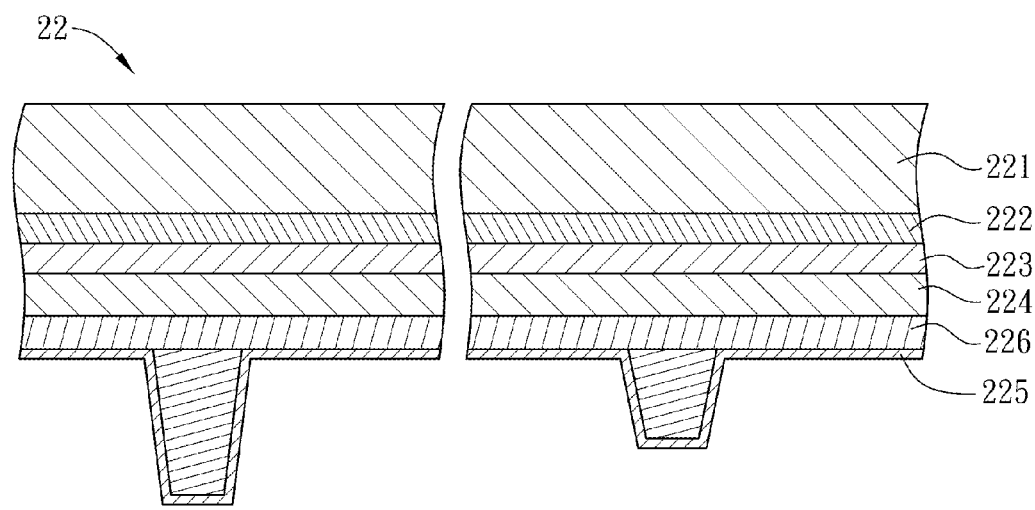
FIG. 1I is a schematic diagram of the second substrate according to another embodiment of this disclosure.

FIG. 1H is a schematic diagram of the first spacer 23 moved against the surface 216 of the first substrate 21 when the LCD apparatus 2 in FIG. 1A is pressed by an external force, and only the first spacer 23 and the partial first substrate 21 are shown therein.

Because the number of the first spacers 23 is much larger than that of the second spacers 25, the first spacer 23 is made by photoresist material so as to have flexibility, the top surface 231 of the first spacer 23 at least partially overlaps the opening O of the second indentation U2, and the second width W2 of the top surface 231 of the first spacer 23 is larger than the first width W1, a plurality of the first spacers 23 will be respectively deformed and pushed into (with contact) the second indentations U2 of the surface 216 of the first substrate 21 when the LCD apparatus 2 is pressed. Thereby, the pressure received by the LCD apparatus 2 from outside can be distributed, and the more contact area can be provided when the first spacers 23 are respectively pushed into the second indentations U2, resulting in the larger lateral friction, which can prevent the relative movement and accompanying rubbing between the spacers and the first substrate 21, so that the first substrate 21 will not be damaged and thus the LCD apparatus 2 will not be subjected to the light leakage problem.

Figure 2A:
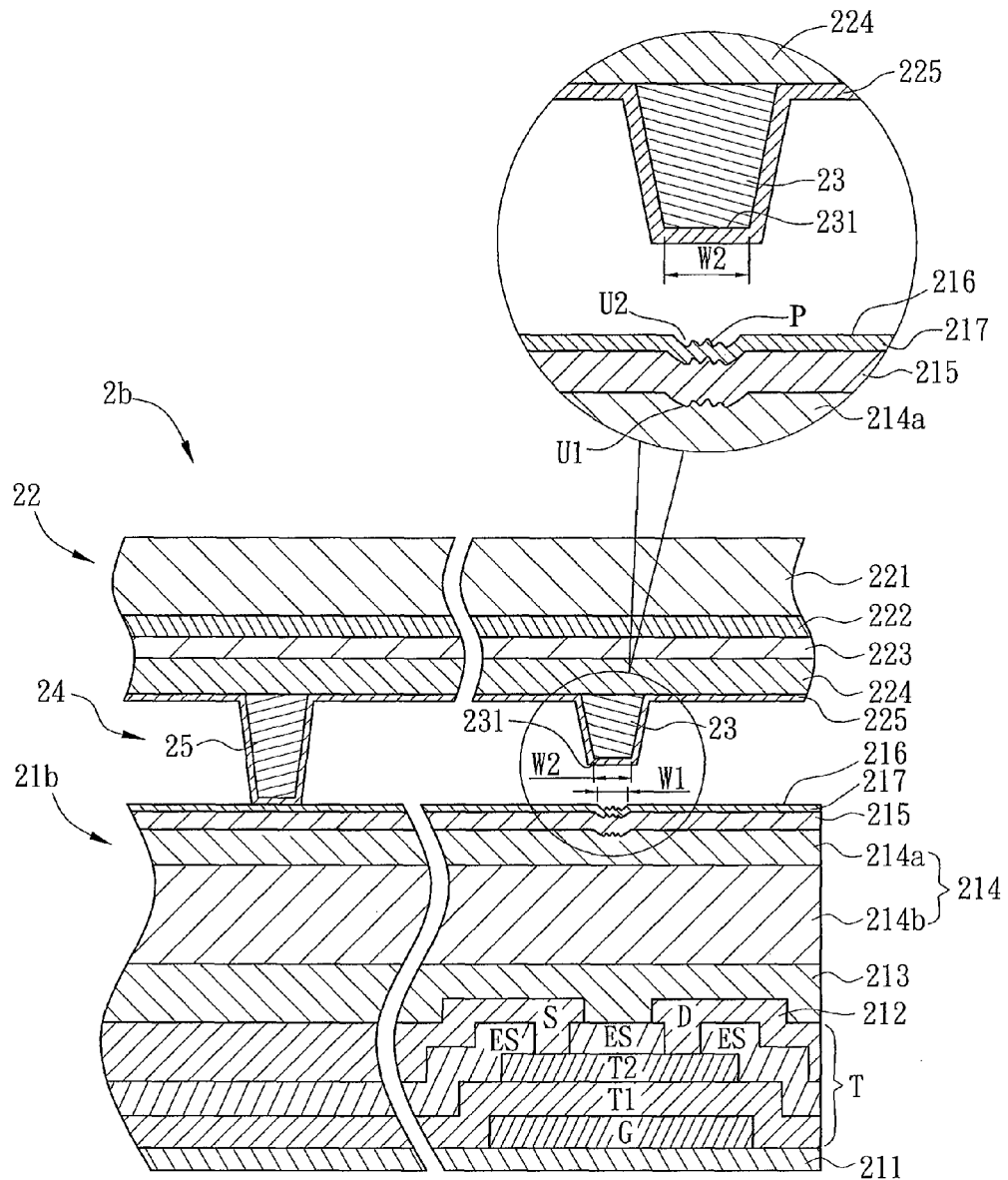
FIGS. 2A to 2E are schematic sectional diagrams of variations of the LCD apparatus according to an embodiment of this disclosure.

FIG. 2A is a schematic sectional diagram of an LCD apparatus 2b according to another embodiment of this disclosure.

Mainly different from the LCD apparatus 2 in FIG. 1A, the bottom of the second indentation U2 of the LCD apparatus 2b has a plurality of protrusions P to become a rough surface for increasing the lateral friction between the first spacer 23 and the second indentation U2. As to the manufacturing process of the protrusions P, a plurality of protrusions are formed first to the bottom of the first indentation U1 of the first insulating layer 214a by using a gray tone photomask, and then a plurality of the protrusions P are formed to the bottom of the second indentation U2 by controlling the manufacturing process.

Figure 2B:
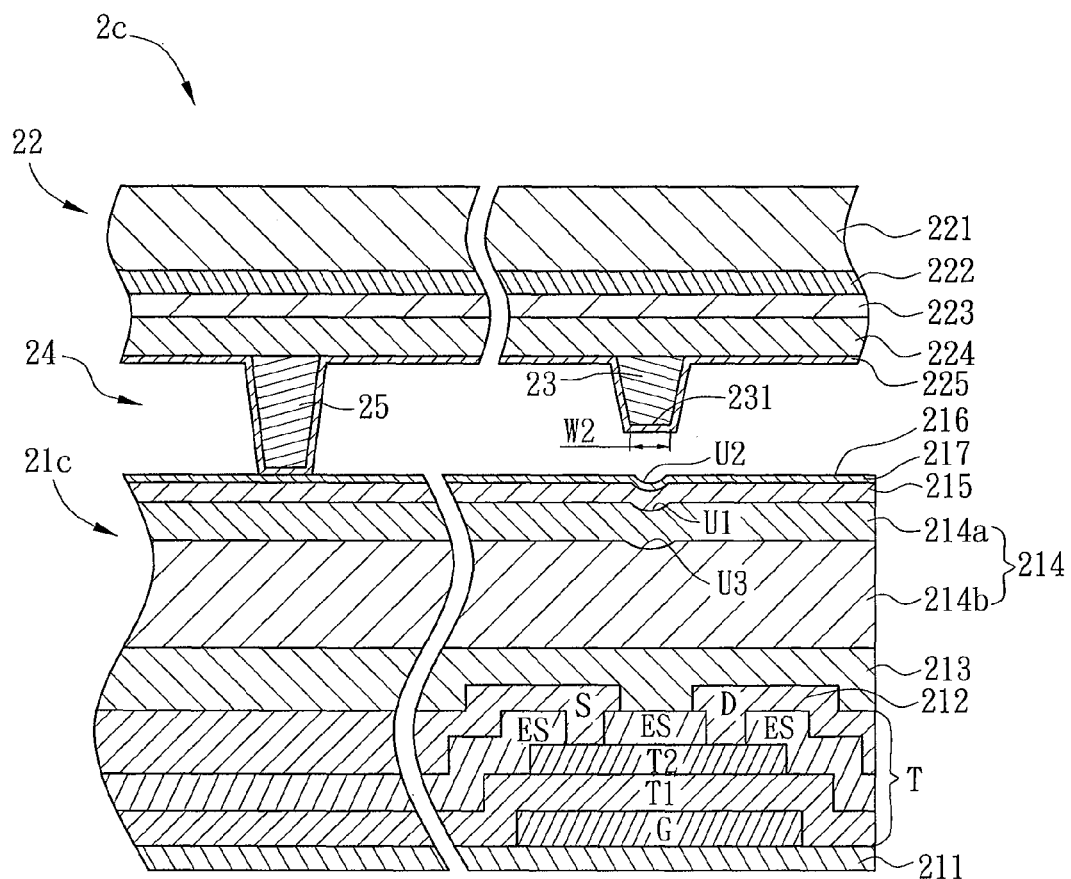

FIG. 2B is a schematic sectional diagram of an LCD apparatus 2c according to another embodiment of this disclosure.

Mainly different from the LCD apparatus 2 in FIG. 1A, the second insulating layer 214b of the first substrate 21c of the LCD apparatus 2c has a third indentation U3, which is disposed corresponding to the first indentation U1, and the depth of the first indentation U1 is less than or equal to that of the third indentation U3. The width of the third indentation U3 can be slightly larger than that of the first indentation U1. In other words, in the manufacturing process, the second insulating layer 214b can be made to have the third indentation U3, so that the surface 216 of the first substrate 21c has the second indentation U2. Besides, the width of the third indentation U3 can be slightly larger than that of the second indentation U2.

Figure 2C:
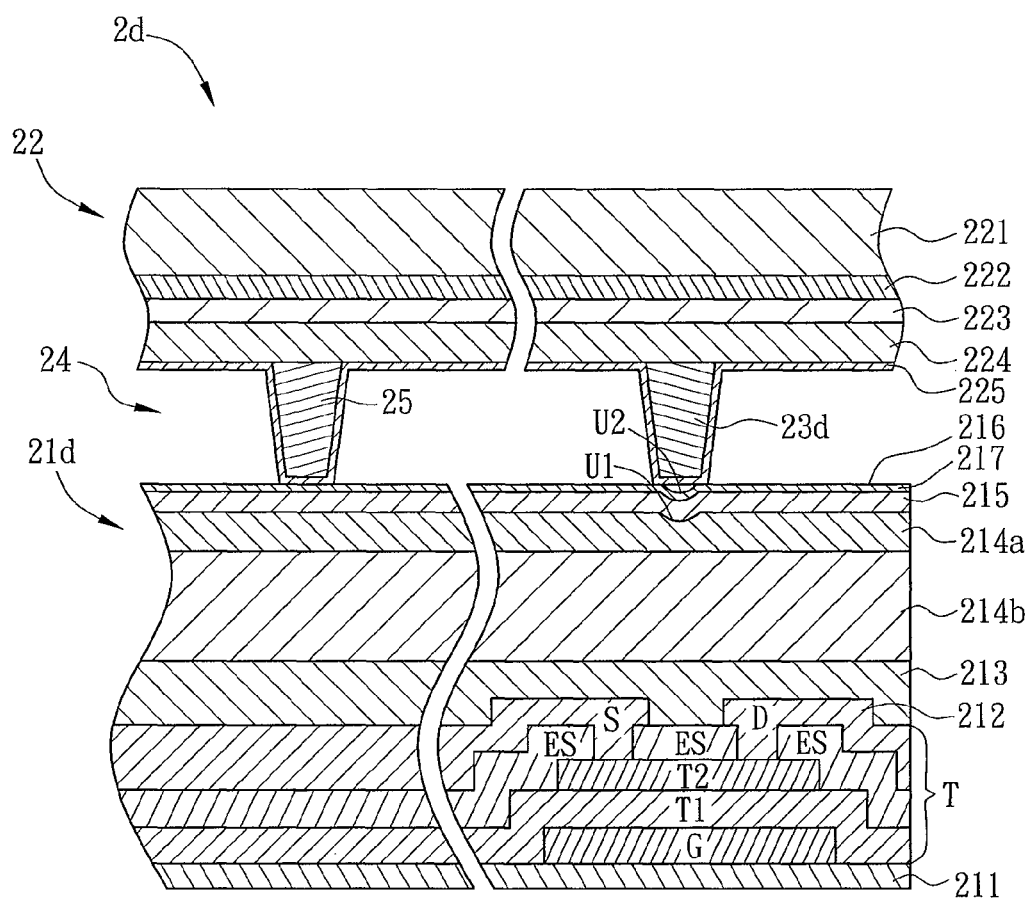

FIG. 2C is a schematic sectional diagram of an LCD apparatus 2d according to another embodiment of this disclosure.

Mainly different from the LCD apparatus 2 in FIG. 1A, the first spacer 23d and the second spacer 25 of the LCD apparatus 2d have the same height according to the direction perpendicular to the transparent substrate 211, and the first and second spacers 23d and 25 are disposed against the surface 216 of the first substrate 21d through the alignment layer 225. When the LCD apparatus 2d is pressed by an external force, the first spacer 23d also can be pushed into the second indentation U2. Thereby, the pressure received by the LCD apparatus 2d from outside can be distributed, and the more contact area can be provided when the first spacers 23d are respectively pushed into the second indentations U2, resulting in the larger lateral friction, which can prevent the relative movement and accompanying rubbing between the spacers and the first substrate 21d, so that the first substrate 21d will not be damaged and thus the LCD apparatus 2d will not be subjected to the light leakage problem.

Other technical features of the LCD apparatuses 2b, 2c and 2d can be known by referring to the LCD apparatus 2, and therefore they are not described here for concise purpose.

Figure 2D:
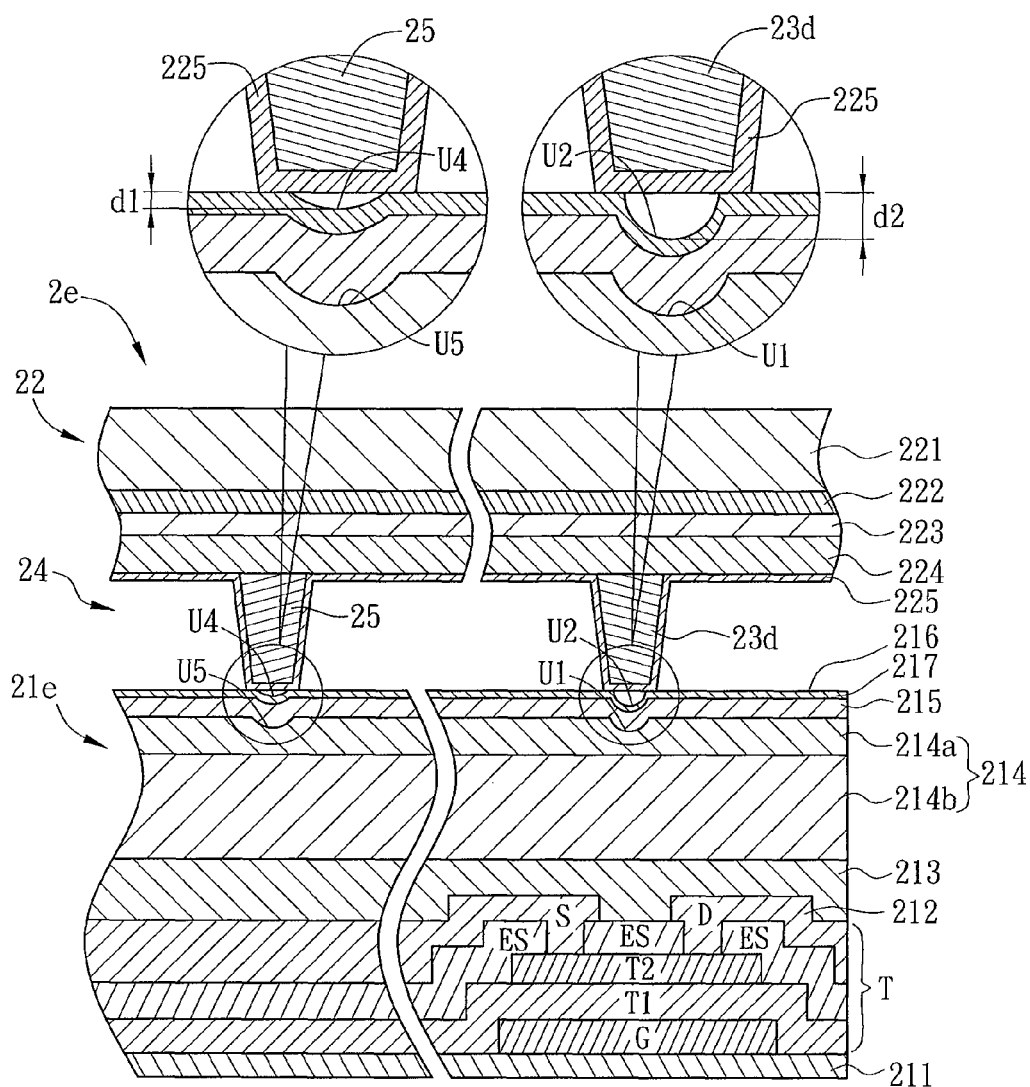

FIG. 2D is a schematic sectional diagram of an LCD apparatus 2e according to another embodiment of this disclosure.

Mainly different from the LCD apparatus 2d in FIG. 2C, the surface 216 of the first substrate 21e of the LCD apparatus 2e further has a fourth indentation U4, which is disposed corresponding to the second spacer 25, and the depth d1 of the fourth indentation U4 is less than the depth d2 of the second indentation U2. Besides, the width of a top surface of the second spacer 25 is larger than that of the opening of the fourth indentation U4. Furthermore, the first insulating layer 214a of the first substrate 21e further has a fifth indentation U5, which is disposed corresponding to the fourth indentation U4, and the depth of the fourth indentation U4 is less than or equal to that of the fifth indentation U5.

Other technical features of the LCD apparatuses 2e can be known by referring to the LCD apparatus 2d, and therefore they are not described here for concise purpose.

Figure 2E:
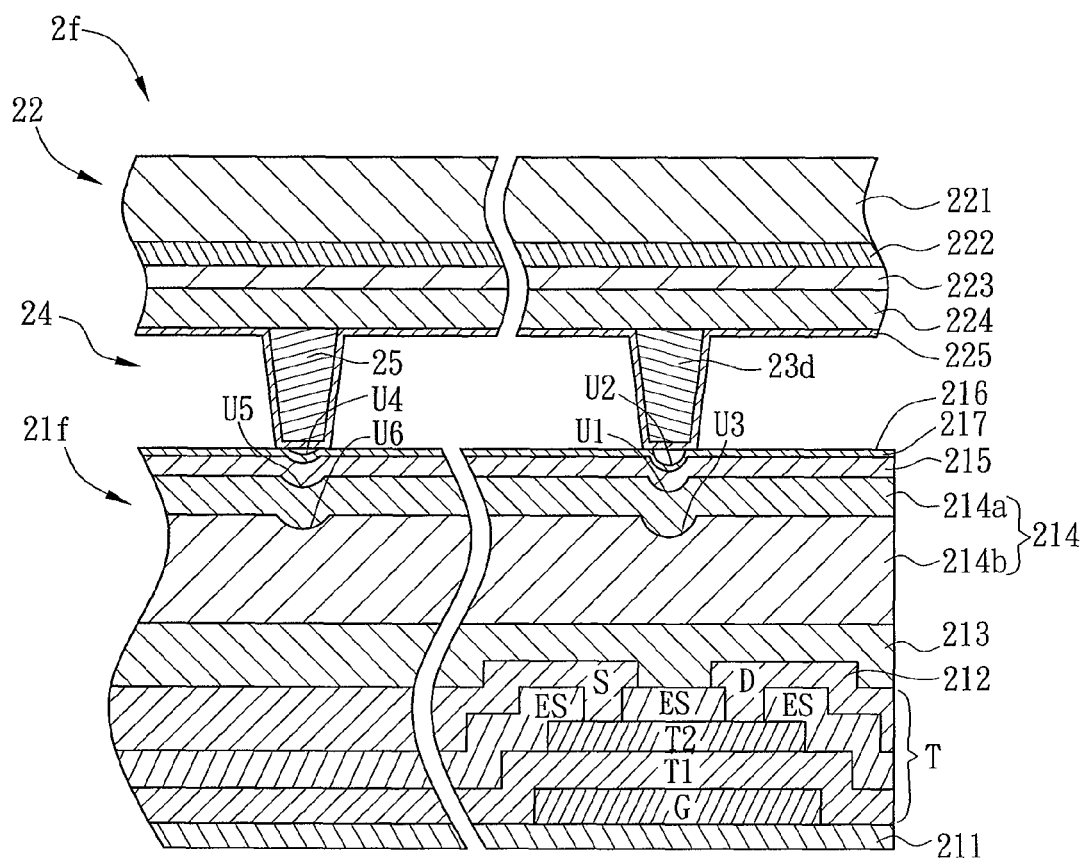

FIG. 2E is a schematic sectional diagram of an LCD apparatus 2f according to another embodiment of this disclosure.

Mainly different from the LCD apparatus 2e in FIG. 2D, the second insulating layer 214b of the LCD apparatus 2f further has a sixth indentation U6 disposed corresponding to the fifth indentation U5, in addition to a third indentation U3 disposed corresponding to the first indentation U1. Besides, the depth of the first indentation U1 is less than or equal to that of the third indentation U3, and the depth of the fifth indentation U5 is less than or equal to that of the sixth indentation U6.

Other technical features of the LCD apparatuses 2f can be known by referring to the LCD apparatus 2e, and therefore they are not described here for concise purpose.

In summary, in the LCD apparatus according to the embodiments of this disclosure, the insulating layer covers the metal layer and has a first indentation, so that the surface of the first substrate has a second indentation. Besides, the top surface of the first spacer at least partially overlaps the opening of the second indentation, and the second width of the top surface is larger than the first width of the second indentation. Therefore, when the LCD apparatus is pressed by an external force, the first spacers are respectively pushed into the second indentations of the first substrate. Thereby, the pressure received by the LCD apparatus from outside can be distributed, and the more contact area can be provided when the first spacers are respectively pushed into the second indentations, resulting in the larger lateral friction, which can prevent the relative movement and accompanying rubbing between the spacers and the first substrate, so that the first substrate will not be damaged and thus the LCD apparatus will not be subjected to the light leakage problem.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display apparatus, comprising:
a first substrate including a transparent substrate, a metal layer, an insulating layer and a first electrode layer, wherein the metal layer is disposed on the transparent substrate, the insulating layer is disposed between the metal layer and the first electrode layer, and covers the metal layer, and the insulating layer has a first indentation, and a surface of the first substrate has a second indentation corresponding to the first indentation and having a first width;
a second substrate disposed opposite to the first substrate;
a first spacer disposed on the second substrate and having a top surface opposite to the second indentation, wherein the top surface and the second indentation at least partially overlap, and the top surface has a second width which is larger than the first width; and
a second spacer disposed on the second substrate,
wherein the depth of the second indentation is less than that of the first indentation,
wherein the metal layer is the same layer as the drain or source of a thin film transistor of the first substrate,
wherein the insulating layer includes a first insulating layer and a second insulating layer, the first insulating layer is disposed on the second insulating layer, and the second insulating layer is disposed above the thin film transistor,
wherein the first spacer and the second spacer have the same height according to the direction perpendicular to the transparent substrate,
wherein the surface of the first substrate has a fourth indentation disposed corresponding to the second spacer, and the depth of the fourth indentation is less than that of the second indentation.

2. The liquid crystal display apparatus as recited in claim 1, further comprising:
a liquid crystal layer disposed between the first substrate and the second substrate.

3. The liquid crystal display apparatus as recited in claim 1, wherein the second insulating layer has a third indentation disposed corresponding to the first indentation, and the depth of the first indentation is less than or equal to that of the third indentation.

4. The liquid crystal display apparatus as recited in claim 1, wherein the second substrate has an additional transparent substrate and a common electrode layer disposed to the additional transparent substrate.

5. The liquid crystal display apparatus as recited in claim 1, wherein the second spacer is disposed against the surface of the first substrate.

6. The liquid crystal display apparatus as recited in claim 1, wherein the width of a top surface of the second spacer is larger than that of the fourth indentation.

7. The liquid crystal display apparatus as recited in claim 1, wherein the first insulating layer further has a fifth indentation disposed corresponding to the fourth indentation, and the depth of the fourth indentation is less than or equal to that of the fifth indentation.

8. The liquid crystal display apparatus as recited in claim 7, wherein the second insulating layer further has a sixth indentation disposed corresponding to the fifth indentation, and the depth of the fifth indentation is less than or equal to that of the sixth indentation.

* * * * *